(12) United States Patent
Manning

(10) Patent No.: US 7,740,764 B1
(45) Date of Patent: Jun. 22, 2010

(54) FLUID CONDITIONING SYSTEM AND PROCESS OF CONDITIONING FLUID

(76) Inventor: James Manning, P.O. Box 5025, Hendersonville, NC (US) 28793

( * ) Notice: Subject to any disclaimer, the term of this patent is extended or adjusted under 35 U.S.C. 154(b) by 40 days.

(21) Appl. No.: 12/034,167

(22) Filed: Feb. 20, 2008

Related U.S. Application Data

(60) Provisional application No. 60/890,920, filed on Feb. 21, 2007.

(51) Int. Cl.
*B01D 35/06* (2006.01)
*C02F 1/48* (2006.01)
(52) U.S. Cl. ................................ 210/695; 210/222
(58) Field of Classification Search ............ 210/222, 210/695
See application file for complete search history.

(56) References Cited

U.S. PATENT DOCUMENTS

| | | | | |
|---|---|---|---|---|
| 4,216,092 A | * | 8/1980 | Shalhoob et al. | 210/222 |
| 4,883,591 A | | 11/1989 | Belasco | |
| 5,348,050 A | * | 9/1994 | Ashton | 210/222 |
| 5,804,068 A | * | 9/1998 | Reed | 210/222 |
| 6,797,159 B2 | * | 9/2004 | Hatton | 210/222 |

* cited by examiner

*Primary Examiner*—David A Reifsnyder
(74) *Attorney, Agent, or Firm*—IP Strategies

(57) ABSTRACT

A process of conditioning a fluid includes passing the fluid through a magnetic field. A fluid conditioning system includes a conduit adapted to allow fluid to pass from a pre-conditioned volume to a post-conditioned volume, and a magnet assembly including at least one magnet disposed such that magnetic field produced by the at least one magnet penetrates the conduit. The conduit is formed from a material that allows the magnetic field produced by the at least one magnet to have a magnetic effect on molecules of the fluid as the fluid passes through the conduit.

20 Claims, 6 Drawing Sheets

FLUID CONDITIONING SYSTEM AND PROCESS OF CONDITIONING FLUID

CROSS-REFERENCE TO RELATED APPLICATION

This is related to, and claims the benefit under 35 USC §119(e) of U.S. Provisional Application for Patent No. 60/890,920, which was filed on Feb. 21, 2007.

FIELD OF THE INVENTION

The invention relates to methods of conditioning water, and to systems that implement conditioning of water.

BACKGROUND OF THE INVENTION

Boiler and cooling tower systems are used for a number of industrial applications. Common to these applications is the presence of water in the system, and the application of heat to the water at some point in the system. Complex reactions can take place in the boiler system, some of which can lead to problems of scaling and corrosion. One of the most common problems encountered in these systems is that of scale formation, that is, the precipitation of mineral contaminants in the water onto surfaces of the heated system. The problem of scale formation has been addressed in many ways; conventional methods typically treat this as a water hardness issue, and use chemicals to "soften" the water in the system, by attempting to remove excess "hardness ions" such as calcium and magnesium ions.

Water molecules are in constant random motion as described by the Brownian motion phenomenon discovered in 1827 by the botanist Robert Brown and explained by Einstein in 1905. Consistent with kinetic theory of modern physics, as the water temperature increases, the level of water molecule motion increases. Colloid, that is, the suspension of tiny particles in the water, is also affected by Brownian motion. In fact, the Brownian motion of the solution is what keeps the particles in suspension.

The most common ways to increase the Brownian motion have the side effect of increasing water temperature. For example, putting a flame to the container or using microwave radiation will increase movement of water molecules, and naturally will increase the temperature as well. Because heat is produced it has been accepted that heat alone is the cause for scale to build and for dissolved oxygen to phase change to a gas at temperature levels called the saturation point.

The relation between molecular motion and heat has concealed the fact that it is the increase of the water molecules' motion that breaks the individual molecule's magnetic grip on the ions of calcium, carbonate, and dissolved oxygen that is the cause for the saturation points to occur. That is, increasing the temperature of the water increases the motion of the water molecules until the saturation point is reached, but it is the physical phenomenon of the increased molecular motion, and not the added heat itself, that causes the saturation point to be reached. The calcium and carbonate ions released from the magnetic grip of the water molecule bond together and precipitate as individual crystals of scale. Dissolved oxygen as single oxygen atoms bond together, producing $O_2$ and gas off in water systems open to atmosphere, or are removed from closed systems. Thus, mineral and dissolved oxygen saturation points of water are not produced by a chemical reaction. Rather, they are triggered by a physical action.

Formulas have been used to predict when scale and oxygen would reach their saturation points. These formulas have used total hardness, total alkalinity, pH, and temperature to determine when scale would form. Replacing "temperature" with "molecular motion" provides a more accurate description of how and when the saturation point of dissolved minerals and oxygen will occur. Magnetic conditioning of water, such as by passing a volume of water through a magnetic field or gradient, can provide this effect, inducing molecular motion of water to simulate the heating effect. This, in turn, can be calculated as a factor in determining the saturation point in the water volume of substances of interest.

When the saturation point will occur depends on the initial temperature of the water before passing through the magnetic conditioner. A lower initial temperature of the water necessitates providing a larger number of magnetic poles that the water must pass through in order to replicate the "heating up" of water molecules. Unlike flames, microwaves, or other sources of heat, the increased motion of the water molecule is instantaneous when the magnetic flux lines are encountered by the water. Each magnetic pole instantly rotates the water molecule 180-degrees as the flux lines of the north and south poles are met. Like poles are repelled and unlike poles are attracted, making motions violent and producing two 180-degree motions per magnet after passing the pole of the first magnet. Heating with a flame takes BTUs plus time to increase the molecular motion. Heating with radiation, plus time, also increases molecular motion.

BRIEF SUMMARY OF THE INVENTION

The magnetic fluid conditioner of the invention uses a magnetic field plus a water velocity over the linear distance of the influence of the magnetic field as analogs of the time of exposure used to raise the molecular motion by flame or radiation. An advantage with magnets is that temperature is not raised; only the Brownian motion of the water molecules is increased. The increase in motion of the water molecules caused by the magnetic field also reduces the amount of energy required to raise the temperature of water to the desired level in boiler systems.

According to an aspect of the invention, a fluid conditioning system includes a conduit adapted to allow fluid to pass from a pre-conditioned volume to a post-conditioned volume, and a magnet assembly including at least one magnet disposed such that magnetic field produced by the at least one magnet penetrates the conduit. The conduit is formed from a material that allows the magnetic field produced by the at least one magnet to have a magnetic effect on molecules of the fluid as the fluid passes through the conduit.

For example, the magnet assembly can include a first magnet pole, having a first polarity, arranged outside a first sidewall of the conduit, and a second magnet pole, having a second polarity, arranged outside a second sidewall of the conduit opposite the first sidewall of the conduit.

Alternatively, the magnet assembly can be arranged such that the at least one magnet is disposed within the conduit, spaced from inner sidewalls of the conduit. Preferably in this case, the at least one magnet is disposed along a longitudinal axis of the conduit.

In another preferred embodiment, the conduit includes an inner shell and an outer shell. The inner shell is a substantially cylindrical first conduit element in which the at least one magnet is disposed and which includes a first port for fluid communication with one of the pre-conditioned volume and the post-conditioned volume. The outer shell is a substantially cylindrical second conduit element disposed in fluid communication with and partially encloses the inner shell and which includes a second port for fluid communication with the other of the pre-conditioned volume and the post-conditioned volume. The inner shell and the outer shell are otherwise closed so as to define a fluid path between the first and second ports.

The conduit preferably is made of a non-ferrous material.

The fluid conditioning system can be used to condition any fluid, such as water.

The pre-conditioned volume and the post-conditioned volume can be included as part of the fluid conditioning system.

A volume of the conduit defined by a cross-section of the conduit and a length of the conduit corresponding to the region of magnetic field penetration of the conduit is a conditioning volume of the system. The conduit preferably has a cross-sectional area designed to maintain a flow rate of the fluid through the conditioning volume within a pre-determined range. The predetermined range can be predetermined, for example, as a factor in combination with the field strength to precipitate an ion, which can be pre-selected, from the fluid in the conditioning volume. Examples of the pre-selected ion are sodium, calcium, carbon, and selenium. The fluid conditioning system can include a pump adapted to maintain a flow rate of the fluid through the conditioning volume within the pre-determined range.

According to another aspect of the invention, a process of conditioning a fluid includes passing the fluid through a magnetic field.

For example, the process can include arranging at least one magnet such that magnetic field produced by the at least one magnet penetrates a fluid conduit, and passing the fluid through the conduit, thereby passing the fluid through the magnetic field produced by the at least one magnet.

The at least one magnet can include opposing magnet poles disposed outside opposite walls of the fluid conduit. Alternatively, the at least one magnet can include at least one magnet disposed within the fluid conduit and spaced from inner sidewalls of the fluid conduit.

The process can also include maintaining a flow rate of the fluid through the conditioning volume within a pre-determined range. For example, a pump can be used to maintain the flow rate of the fluid through the conditioning volume within the pre-determined range. Preferably, the range is predetermined as a factor in combination with a field strength of the magnetic field such that a pre-selected ion is precipitated from the fluid in the conditioning volume. Examples of the pre-selected ion are sodium, calcium, carbon, and selenium.

DETAILED DESCRIPTION OF THE INVENTION

The invention provides a process of conditioning a fluid that includes passing the fluid through a magnetic field, and an apparatus that is adapted to perform such a process.

According to the invention, magnetic material is arranged such that the resulting magnetic field penetrates a fluid conduit, so that passing the fluid through the conduit results in passing the fluid through the magnetic field. Preferably, a flow rate of the fluid through the conditioning volume is maintained within a pre-determined range, calculated with respect to the strength of the magnetic field, such that a pre-selected ion is precipitated from the fluid. The ion will then pass through the post-conditioned portion of the system without causing scaling effects and, in the case of gaseous ions, will pass into the atmosphere in open systems. The rate of flow of the water passing through the conditioning volume can be controlled through the use of a pump or other device used to provide flow, and by specification of the geometry of the conditioning volume. The rate of flow of the water being conditioned is very important, because the linear distance covered in passing the magnetic material corresponds to the time of exposure to the magnetic field. If the velocity is too slow, the induced molecular motion might not be violent enough to reach the saturation point to precipitate the ions of interest.

By adjusting the parameters of the magnetic conditioning system, such as the strength and physical dimensions of the magnets and the rate of flow of the fluid passing through the conditioning volume, it is possible to perform selective withdrawal of ions from the water based on the known temperature saturation point of that ion in water. That is, saturation point data derived from past temperature treatment studies can be related to magnetic conditioning such that parameters of the magnetic system can be adjusted to target ions of interest present in the water to be conditioned. This would be especially useful in eliminating heavy metals, such as selenium, from water.

It should be apparent to one skilled in the art that magnetic material can take any form, including one or more discrete magnets. Terms describing magnetic material will be used interchangeably herein, and are not limiting of the particular form of material or discrete magnets to be used. Also, the magnets need not be permanent magnets but also can be, for example, electromagnets, or any other means of providing a magnetic field, and any such means is intended for advantageous use by the process and apparatus of the invention.

Figure 1:
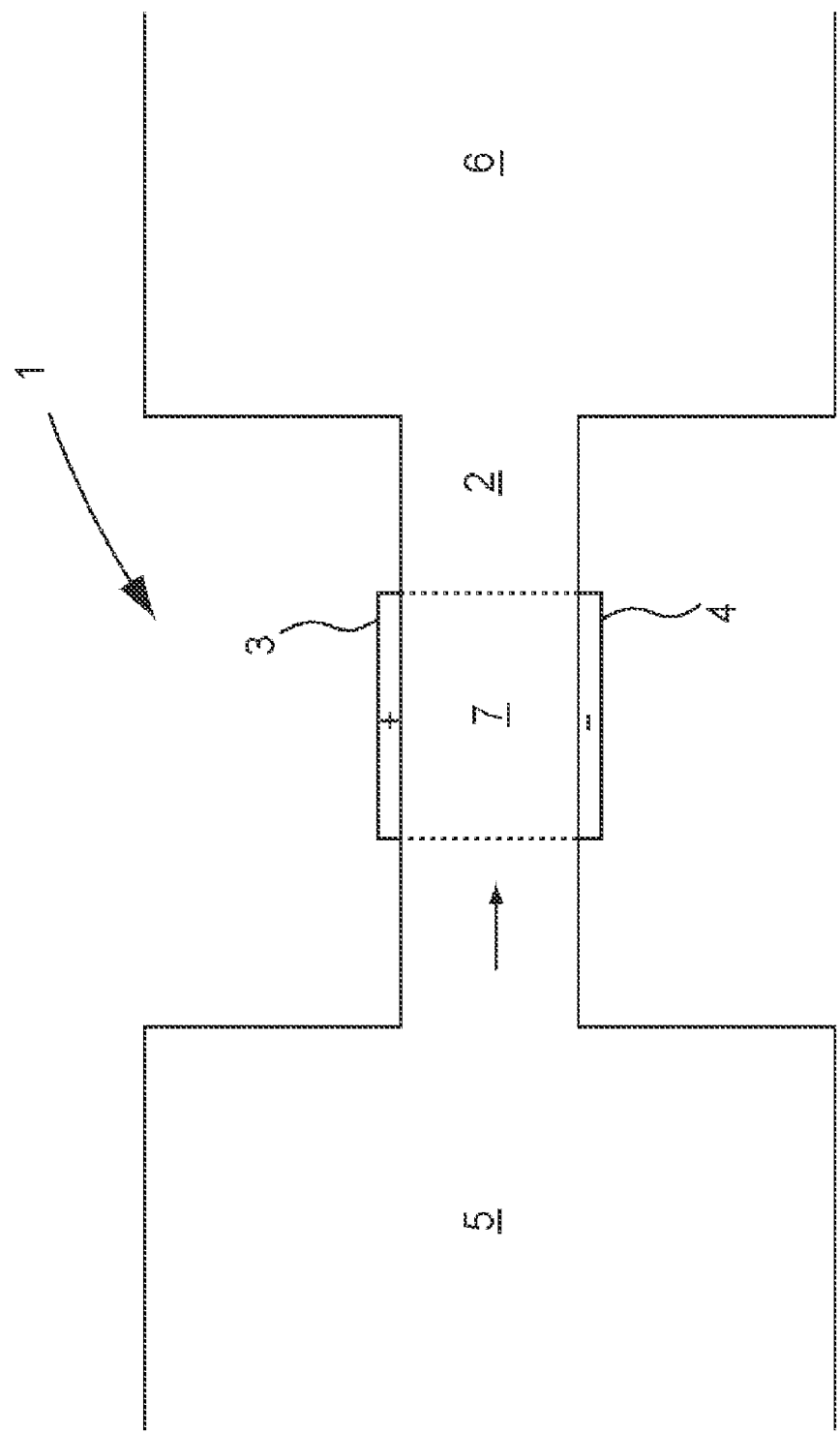
FIG. 1 is a cross-sectional view of an exemplary embodiment of the fluid conditioning system of the invention.

FIG. 1 shows a first exemplary embodiment of the invention. As shown, a fluid conditioning system 1 includes a conduit 2, a first magnet pole 3, and a second magnet pole 4. The conduit 2 is part of the flow path of the fluid as the fluid passes from a pre-conditioned volume 5 to a post-conditioned volume 6. The first magnet pole 3 has a first polarity and is arranged outside a first sidewall of the conduit 2; in this exemplary embodiment, the first magnet pole 3 has a positive polarity. The second magnet pole 4 has a second polarity, in this embodiment a negative polarity, and is arranged outside a second sidewall of the conduit 2 opposite the first sidewall of the conduit 2.

The conduit 2 preferably is formed from a non-ferrous material, such as steel, copper, or plastic (PVC), to allow a magnetic effect of the first and second magnetic poles 3, 4 to have a magnetic effect on molecules of the fluid as the fluid passes through the conduit 2. A conditioning volume 7 of the system is defined as the volume bounded by a cross-section of the conduit 2 and a length of the conduit 2 corresponding to the lengths of the first and second magnet poles 3, 4.

Preferably, the cross-sectional area of the conduit 2 is selected to maintain a flow rate of the fluid through the conditioning volume 7 within a pre-determined range. The first and second magnet poles produce a magnetic field having a field strength within the conduit, and the predetermined range is predetermined such that a pre-selected ion precipitates from the fluid in the conditioning volume. For example, the pre-selected ion can be calcium, carbon, or selenium.

Figure 2:
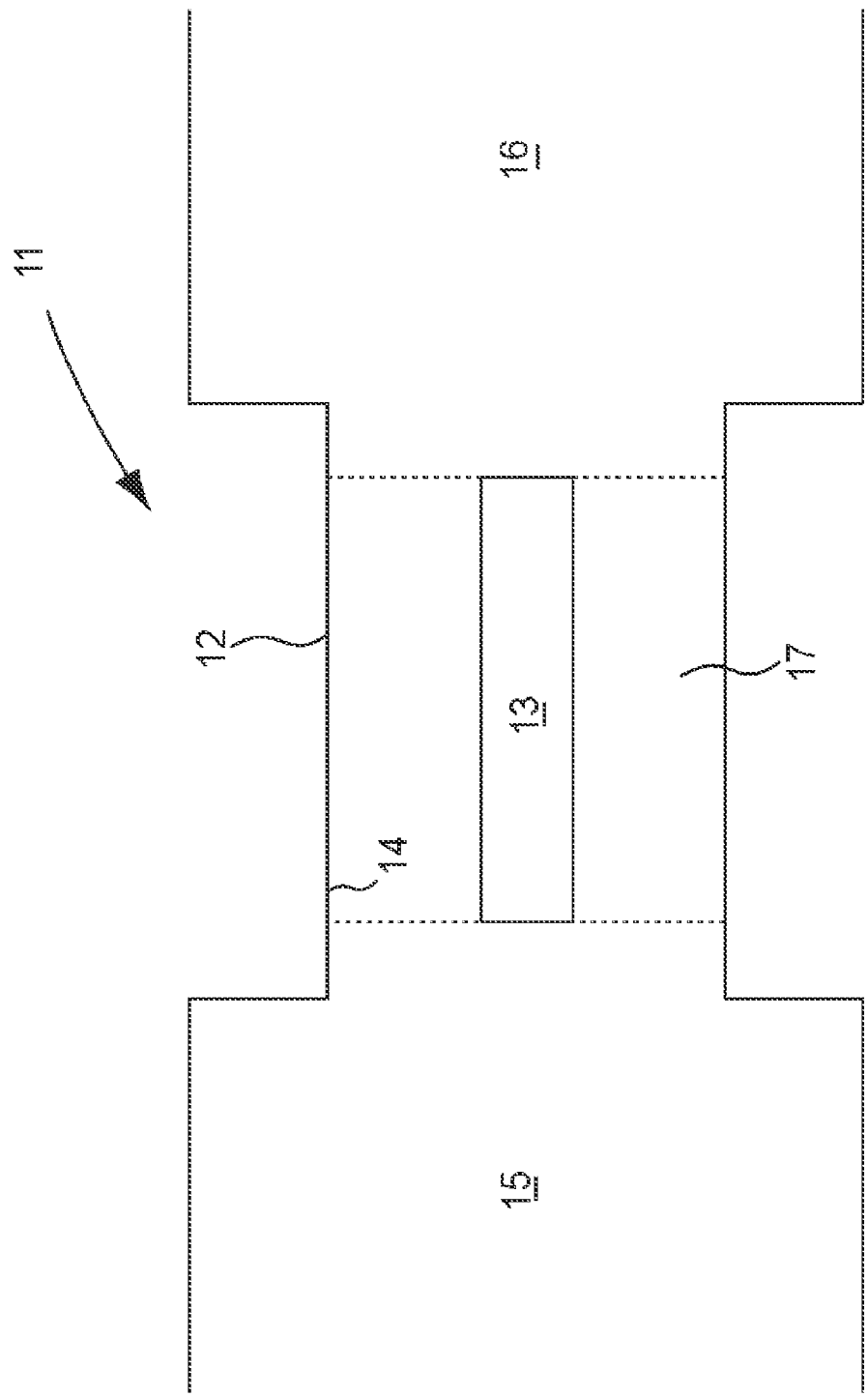
FIG. 2 is a cross-sectional view of another exemplary embodiment of the fluid conditioning system of the invention.

Alternatively, magnets can be disposed within the conduit, allowing the fluid to be conditioned as it flows past the magnets. As shown in FIG. 2, this embodiment of a fluid conditioning system 11 includes a conduit 12 and a magnet array 13. The conduit 12 is part of the flow path of the fluid as the fluid passes from a pre-conditioned volume 15 to a post-conditioned volume 16. The magnet array 13 is arranged within the conduit 12, preferably spaced some distance from an inner sidewall 14 of the conduit 12. For example, the conduit 12 can have a uniform cross-section, such as that of a cylinder, and the magnet array 13 can be arranged along a longitudinal axis of the conduit 12, substantially evenly spaced from the inner sidewall 14 of the conduit 12 on all sides. Again, the conditioning volume 17 of the system is defined as the volume bounded by a cross-section of the conduit 12 and a length of the conduit 12 corresponding to the length of the magnet array 13. As in the previous example, the cross-sectional area of the conduit 12 is selected to maintain a flow rate of the fluid through the conditioning volume 17 within a pre-determined range. The magnet array 13 produce a magnetic field having a field strength within the conduit 12, and the predetermined range is predetermined as a factor that, in combination with the field strength within the conduit 12, causes the pre-selected ion to precipitate from the fluid in the conditioning volume.

Figure 3:
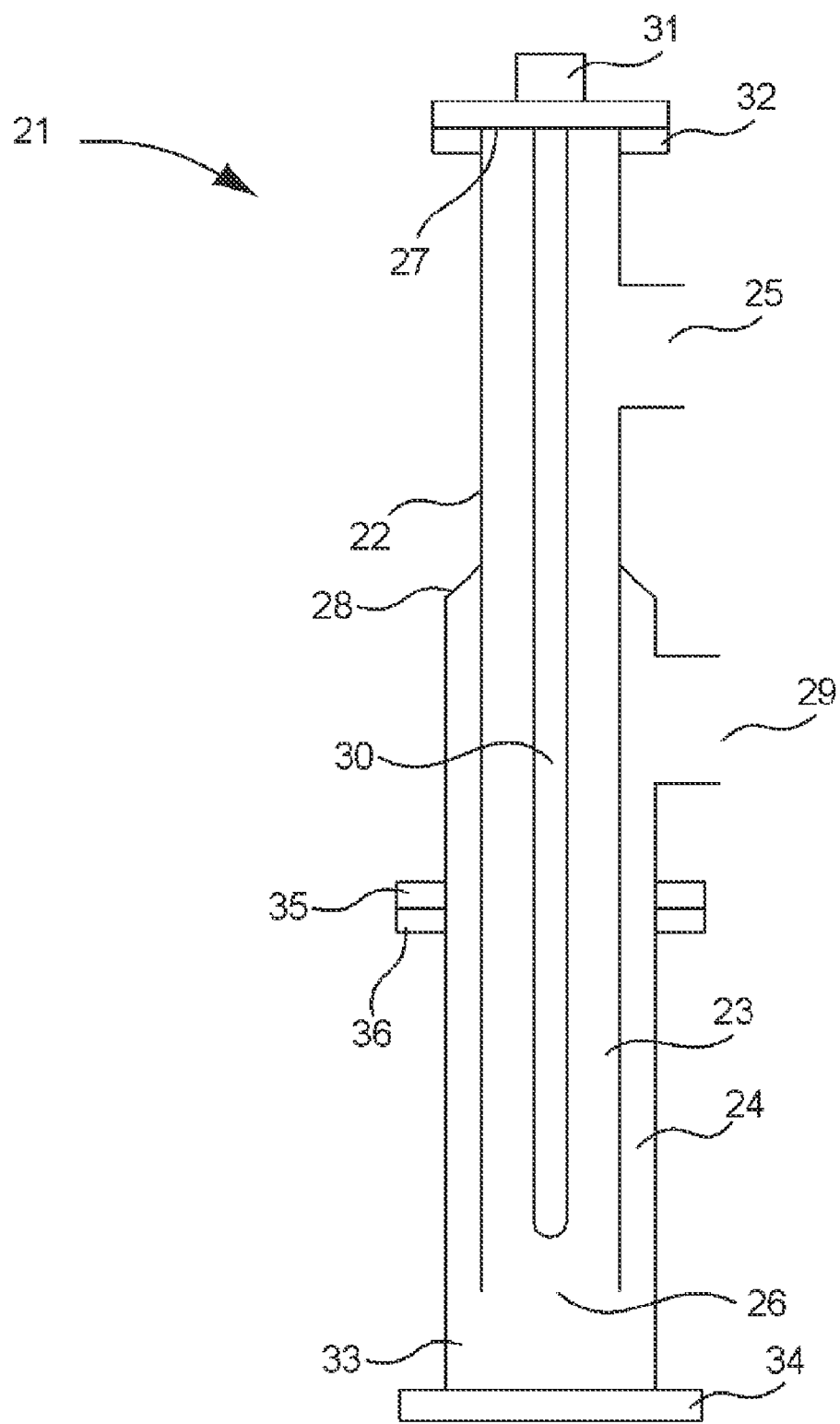
FIG. 3 is a cross-sectional view of another exemplary embodiment of the fluid conditioning system of the invention.

FIG. 3 shows another exemplary embodiment of the conditioning system 21, in which it is possible to subject the fluid to double-pass conditioning. In this embodiment, the conduit 22 includes an inner conduit element 23 and an outer conduit element 24. These conduit elements can be, for example, cylinders. The inner conduit element 23 preferably is arranged within the outer conduit element 24 such that the longitudinal axes of the conduit elements align. As shown, the inner conduit element 23 extends from the outer conduit element 24 enough to provide room for a fluid communication port 25 between the inner conduit element 23 and either the pre-conditioned volume or the post-conditioned volume. For ease of explanation, this port 25 will be designated as an output port for fluid communication from the conduit 22 to the post-conditioned volume of the fluid to be conditioned, although it can function as either an input port or an output port, depending on the direction of flow of the fluid within the conduit.

The inner conduit element 23 extends within the outer conduit element 24 at one end 26, and is closed at the other end 27, at or at some distance after the output port 25. The end 26 of the inner conduit element 23 extending within the outer conduit element 24 is open, providing fluid communication between the inner conduit element 23 and the outer conduit element 24 at a first end 33 of the outer conduit element 24, where the flow changes direction in passing between the two conduit elements. The outer conduit element 24 is closed at a second end 28, at or near a fluid communication port 29 from the inner conduit element 23 to either the pre-conditioned volume or the post-conditioned volume, here designated as an inlet port.

A magnetic core array 30 is arranged within the inner conduit element 23, preferably along a longitudinal axis of the conduit elements. In the embodiment shown in FIG. 3, the magnetic core array 30 extends from the closed end 27 of the inner conduit element 23 to near the opposite end 26 of the inner conduit element 23, although other particular arrangements are contemplated for advantageous use with similar embodiments of the water conditioning system of the invention. Fluid to be conditioned flows in the inlet port 29 from the pre-conditioned volume, through the outer conduit element 24 surrounding the inner conduit element 23, enters the inner conduit element 23 at the open end 26, then flows through the inner conduit element 23 back toward the outlet port 25 to be collected or used in the post-conditioned volume. The length of the magnetic core array 30 determines the size of the conditioning volume and the strength of the field produced by the magnetic core array 30 determines whether the conditioning volume extends to the fluid path in the outer conduit element 24.

The magnetic core array 30 preferably is attached to a bronze flange 31, or similar connection, at one end, and the flange 31 in turn is attached to a mating bronze fixture 32, or similar fixture, outside the closed end 27 of the inner conduit element 23. For ease of construction, the inner conduit element 23 preferably is made of copper and the outer conduit element preferably is made of steel. In certain applications, PVC can also be used. The magnetic core 30 preferably includes a magnetic material or discrete magnet components held by a container made of non-ferrous material, such as copper. The flange connection of the core 30 to the end 27 of the inner conduit element 23 allows for easy removal and maintenance of the core 30, such as for cleaning of, for example, accumulated metal particles. The other end 33 of the outer conduit element is connected to a plate 34 or other closure, preferably made of metal such as aluminum.

Figure 4:
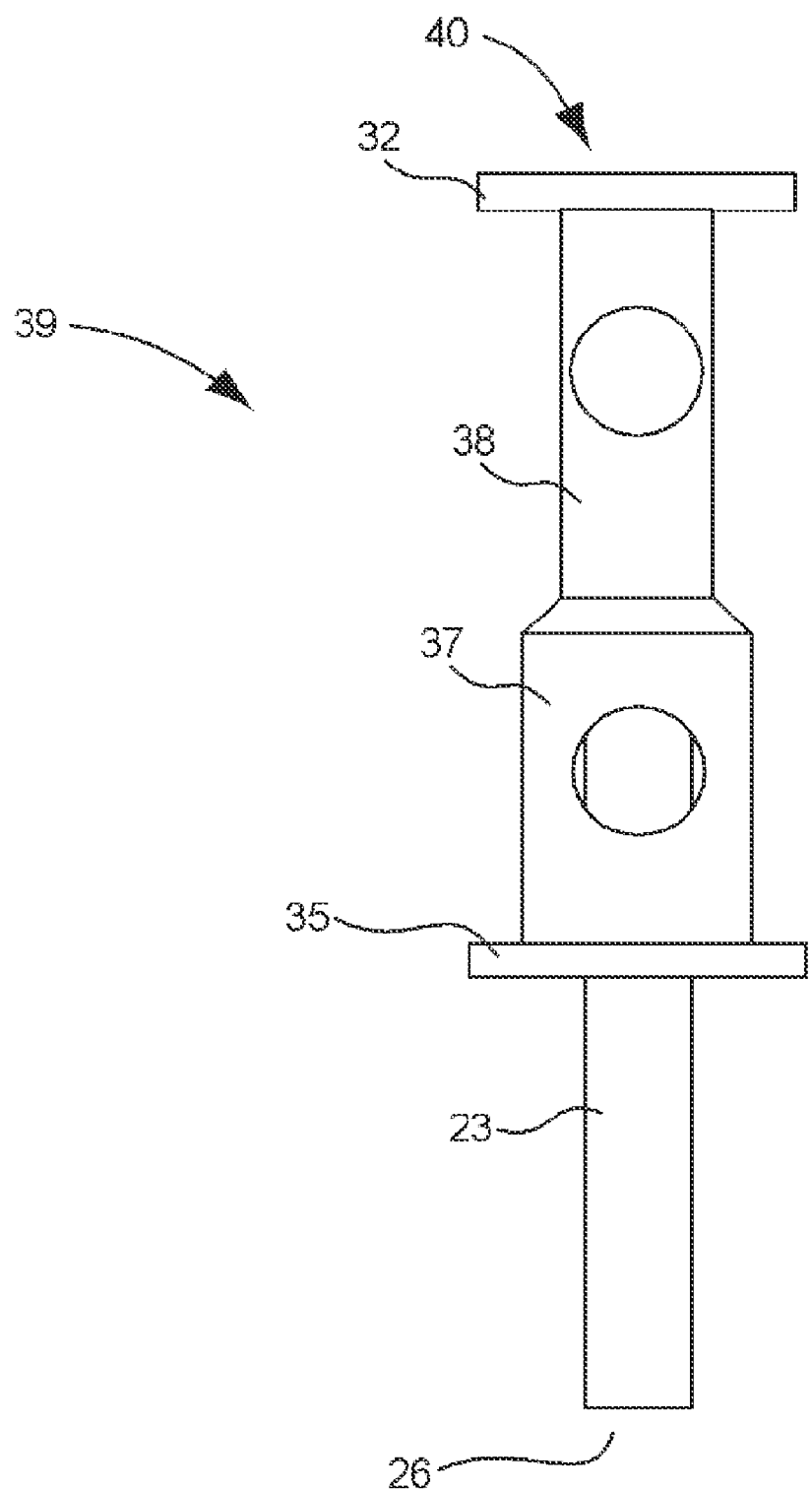
FIG. 4 shows a partially-assembled construction of the embodiment of FIG. 3.

FIG. 4 shows a view of the embodiment of FIG. 3, partially assembled. As shown, a first component 37 of the outer conduit element 24 and an outer enclosure 38 for the fixed end of the inner conduit element 23 form a conditioner head 39 into which the inner conduit element 23 is inserted. The inner conduit element 23 is shown with the open end 26 exposed, extending from the conditioner head 39. This component 37 of the outer conduit element 24 includes the fluid inlet port 29, through which a portion of the inner conduit element 23 can be seen. The fluid outlet port 25 is also shown as part of the conditioner head 39. The open end 26 of the inner conduit element 23 is inserted into a second component of the outer conduit element, and the two outer conduit element 24 components are fixed together at mating fixtures 35, 36 (see FIG. 3) to complete construction of the conduit 22. As mentioned previously, the magnet assembly 30 can then be inserted through the other end 40 of the conditioner head 39.

Figure 5:
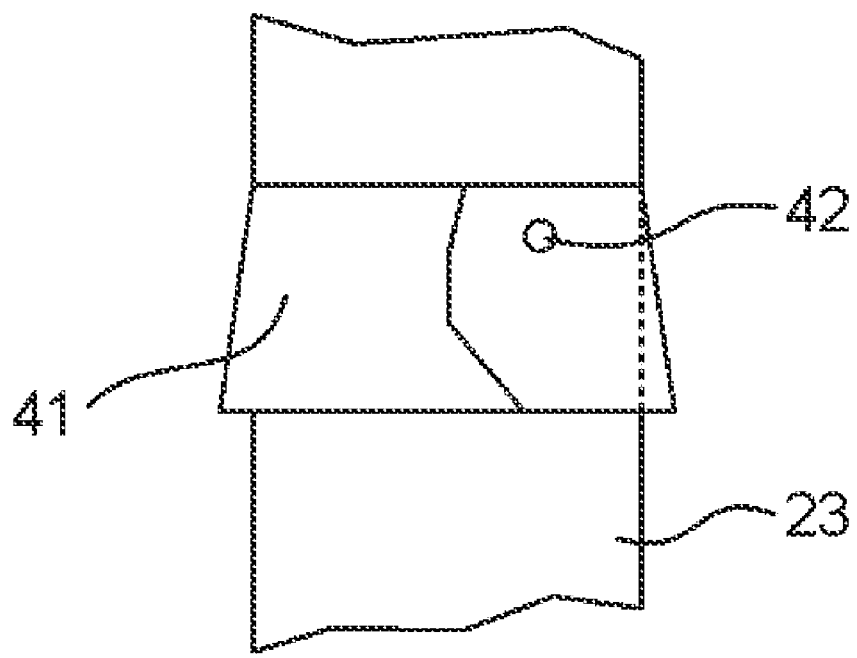
FIG. 5 shows a Venturi skirt that can be used with the embodiment of FIG. 3.
Figure 6:
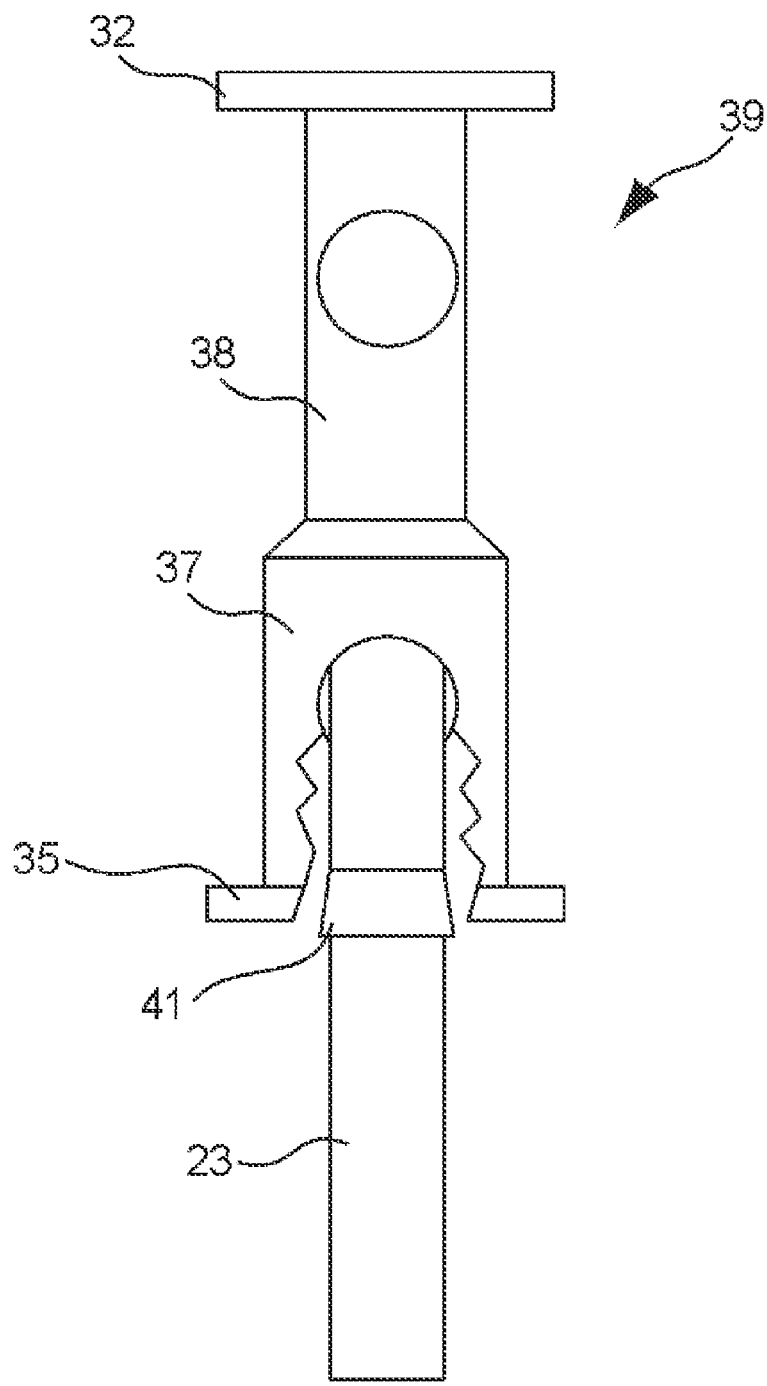
FIG. 6 shows a cut-away view of the conditioning head of FIG. 4 with a view of the Venturi skirt of FIG. 5.

A pump (not shown) is typically used to maintain flow of the fluid through the conduit 22. Controlling the pump output in turn controls the flow rate of the fluid. The flow rate can be increased through at least a portion of the conditioning volume through the use of a Venturi implement, such as an orifice plate. FIG. 5 shows a Venturi skirt 41 that can be attached to the outside of the inner conduit element 23, providing a radial orifice plate that produces a Venturi effect on fluid passing through the outer conduit element 24 in that region. FIG. 6 shows a cutaway view of the conditioner head 39 and the Venturi skirt 41 attached to the inner conduit element 23 within. The Venturi skirt 41 is oriented for the flow direction as designated in this exemplary embodiment. For a reverse flow path, that is, in through the inner conduit element 23 port 25 and out through the outer conduit element 24 port 29, the Venturi skirt 41 would be oriented in the opposite direction, providing a gradual restriction of flow volume. As shown, the skirt 41 includes one or more seeding holes 42 for colloidal seeding of the fluid in the region of the Venturi skirt 41.

The system and process described herein has many applications in industry. For example, the described system can be used in a feed tank for a conventional boiler system or cooling tower. The discussion of the invention to this point has been limited to conditioning of water. However, it should be apparent to those of skill in the art that the principles of the invention can be applied to any fluid, and the scope of the invention is intended to cover conditioning of any fluid in like manner. For example, fuels, including gasoline, diesel fuel, boiler fuel oil, and natural gas can be conditioned according to the invention, at any phase of production of the fuel. Systems using reverse osmosis filtering can use the conditioning method of the invention to enhance recovery rates and reduce the scaling of membranes. Agricultural applications that use pumping systems, such as the processing of livestock, and applications as diverse as forestry, hydroponics, nurseries, hot houses, and mushroom farming can benefit from the conditioning system and process of the invention. For example, conditioning of wine according to the invention prior to bottling to remove oxygen can obviate the need to add sulfites.

Particular exemplary embodiments of the present invention have been described in detail. These exemplary embodiments are illustrative of the inventive concept recited in the appended claims, and are not limiting of the scope or spirit of the present invention as contemplated by the inventor.

I claim:

1. A fluid conditioning system, comprising:
   a conduit adapted to allow fluid to pass from a pre-conditioned volume to a post-conditioned volume, wherein the conduit includes a first conduit element and a second conduit element;
   a magnet assembly including at least one magnet disposed such that magnetic field produced by the at least one magnet penetrates a conditioning volume within the conduit; and
   a venturi device;
   wherein the conduit is formed from a material that allows the magnetic field produced by the at least one magnet to have a magnetic effect on molecules of the fluid as the fluid passes through the conduit;
   wherein the magnet assembly is arranged such that the at least one magnet is disposed within the conduit, spaced from inner sidewalls of the conduit;
   wherein the first conduit element, in which the at least one magnet is disposed, includes a first port for fluid communication with one of the pre-conditioned volume and the post-conditioned volume;
   wherein the second conduit element is disposed in fluid communication with and partially encloses the first conduit element and includes a second port for fluid communication with the other of the pre-conditioned volume and the post-conditioned volume;
   wherein the first conduit element and the second conduit element are otherwise closed so as to define a fluid path between the first and second ports; and
   wherein the venturi device is arranged outside of the first conduit element and within the second conduit element.

2. The fluid conditioning system of claim 1, wherein the magnet assembly includes:
   a first magnet pole, having a first polarity, arranged outside a first sidewall of the conduit; and
   a second magnet pole, having a second polarity that is opposite the first polarity, arranged outside a second sidewall of the conduit opposite the first sidewall of the conduit.

3. The fluid conditioning system of claim 1, wherein the at least one magnet is disposed along a longitudinal axis of the conduit.

4. The fluid conditioning system of claim 1, wherein the conduit is made of a non-ferrous material.

5. The fluid conditioning system of claim 1, wherein the fluid is predominantly water.

6. The fluid conditioning system of claim 1, further comprising the pre-conditioned volume and the post-conditioned volume.

7. The fluid conditioning system of claim 1, wherein a volume of the conduit defined by a cross-section of the conduit and a length of the conduit corresponding to the region of magnetic field penetration of the conduit is the conditioning volume of the system.

8. The fluid conditioning system of claim 7, wherein the conduit has a cross-sectional area designed to maintain a flow rate of the fluid through the conditioning volume within a pre-determined range.

9. The fluid conditioning system of claim 8, wherein the magnetic field produced by the at least one magnet has a field strength within the conduit, and wherein the predetermined range is predetermined as a factor in combination with the field strength to precipitate a selected ion from the fluid in the conditioning volume.

10. The fluid conditioning system of claim 9, wherein the ion is pre-selected from the group consisting of at least one of sodium, calcium, carbon, and selenium.

11. The fluid conditioning system of claim 7, further comprising a pump adapted to maintain a flow rate of the fluid through the conditioning volume within a pre-determined range.

12. The fluid conditioning system of claim 11, wherein the magnetic field produced by the at least one magnet has a field strength within the conduit, and wherein the predetermined range is predetermined as a factor in combination with the field strength to precipitate a selected ion from the fluid in the conditioning volume.

13. The fluid conditioning system of claim 12, wherein the ion is pre-selected from the group consisting of at least one of sodium, calcium, carbon, and selenium.

14. A process of conditioning a fluid, comprising:
   arranging at least one magnet such that a magnetic field produced by the at least one magnet penetrates a conditioning volume within a fluid conduit;
   arranging the conduit such that a fluid path passes through the conditioning volume at least twice;
   arranging a venturi device within the conduit;
   passing the fluid through the conduit, thereby passing the fluid through the magnetic field produced by the at least one magnet and through a venturi region created by flow of the fluid past the venturi device.

15. The process of claim 14, wherein the at least one magnet includes opposing magnet poles disposed outside opposite walls of the fluid conduit.

16. The process of claim 14, wherein the at least one magnet includes at least one magnet disposed within the fluid conduit and spaced from inner sidewalls of the fluid conduit.

17. The process of claim 14, further comprising maintaining a flow rate of the fluid through the conditioning volume within a pre-determined range.

18. The process of claim 17, further comprising predetermining the range as a factor in combination with a field strength of the magnetic field such that a pre-selected ion is precipitated from the fluid in the conditioning volume.

19. The process of claim 18, wherein the pre-selected ion is at least one of calcium, carbon, and selenium.

20. The process of claim 17, further comprising using a pump to maintain the flow rate of the fluid through the conditioning volume within the pre-determined range.

* * * * *